(12) United States Patent
Williams

(10) Patent No.: US 6,508,203 B2
(45) Date of Patent: Jan. 21, 2003

(54) ANIMAL EAR HOLDER APPARATUS AND METHOD OF OBTAINING DESIRED ANIMAL BEHAVIOR

(76) Inventor: Darla Williams, 3289 Highfells Rd., Jackson, GA (US) 30233

( * ) Notice: Subject to any disclaimer, the term of this patent is extended or adjusted under 35 U.S.C. 154(b) by 0 days.

(21) Appl. No.: 09/855,161

(22) Filed: May 14, 2001

(65) Prior Publication Data

US 2002/0166514 A1 Nov. 14, 2002

(51) Int. Cl.$^7$ ................................................ A01K 15/00
(52) U.S. Cl. .................... 119/712; 119/814; 54/80.1; 54/6.1; 2/423
(58) Field of Search ................................ 119/814, 837, 119/851, 712, 850; 54/71, 6.1, 6.2, 1, 80.1; 2/410, 4, 421, 422, 423, 209

(56) References Cited

U.S. PATENT DOCUMENTS

| 56,537 | A | * | 7/1866 | Dubree | 54/6.1 |
|---|---|---|---|---|---|
| 138,894 | A | * | 5/1873 | Isidor | 2/209 |
| 190,720 | A | * | 5/1877 | Kleinert | 128/866 |
| 316,029 | A | * | 4/1885 | Gillespie | 2/209 |
| 389,735 | A | * | 9/1888 | Britton | 2/209 |
| 758,680 | A | * | 5/1904 | Otte | 2/209 |
| 3,998,033 | A | * | 12/1976 | Watkins et al. | 54/15 |
| 4,059,406 | A | * | 11/1977 | Fleet | 204/409 |
| 4,148,279 | A | * | 4/1979 | Hoytt | 119/814 |
| 4,221,189 | A | * | 9/1980 | Olvera | 119/814 |
| 4,233,942 | A | * | 11/1980 | Williams | 119/814 |
| 4,404,789 | A | * | 9/1983 | Denning | 2/15 |
| 5,540,189 | A | * | 7/1996 | Masson | 119/814 |
| 5,685,021 | A | * | 11/1997 | Tsujino | 2/209 |
| 5,718,001 | A | * | 2/1998 | Wright | 128/864 |
| 5,920,912 | A | * | 7/1999 | Patchett | 128/866 |
| 6,041,440 | A | * | 3/2000 | Jackson | 128/866 |
| 6,128,891 | A | * | 10/2000 | McMahon | 119/850 |
| 6,195,806 | B1 | * | 3/2001 | Campbell | 128/866 |
| 6,216,642 | B1 | * | 4/2001 | Hung | 119/850 |

OTHER PUBLICATIONS

Dr. Michelle Kennedy and Sheryl Arnold, co–founders of Vice Breaker, Inc.; <<www.vicebreaker.com/0421.htm>>; P.O. Box, 2842 Nesterville Road., Cotopaxi, CO, 81223.
Axwood Farm, Contact: nori@axwoodfarm.com, charlotte@localaccess.com; Application of the Kicking Strap, <<www.axwoodfarm.com/kickingstrap.shtml>>.
Horseracingbc, <<www.horseracingbc.com/page801.htm>>, Contact: rhagg@direct.ca, Horse and Rider Manual.

* cited by examiner

Primary Examiner—Yvonne Abbott

(57) ABSTRACT

An animal ear holder apparatus capable of being easily, comfortably and securely placed on the head of an animal, wherein the ears of the animal are comfortably restrained in a forward position, thereby preventing undesirable animal behaviors, such as for exemplary purposes only, kicking, biting or bucking.

16 Claims, 5 Drawing Sheets

ANIMAL EAR HOLDER APPARATUS AND METHOD OF OBTAINING DESIRED ANIMAL BEHAVIOR

TECHNICAL FIELD

The present invention relates generally to animal headgear and, more specifically, to an ear holder device capable of comfortably restraining the ears of an animal in a forward position, thereby influencing the behavior of the animal, and method thereof. The present invention is particularly useful in, although not strictly limited to, equine applications, wherein an individual desires to modify the behavior of a horse to eliminate kicking, biting and/or bucking.

BACKGROUND OF THE INVENTION

Individuals have been forming lasting relationships with animals for centuries. Domestic pets, such as cats and dogs, bestow many benefits to their owners. Horses, too, often bond with their owners and offer steadfast companionship. All types of animals, however, sometimes exhibit behaviors and vices that are unacceptable, or even dangerous, to humans, such as biting, kicking or bucking.

One such example is kicking by horses. This negative behavior is more than a nuisance. The muscular strength behind a horse's kick is certainly adequate to inflict a serious injury, and can even deliver a deadly blow. Thus, while it is imperative to avoid being kicked, it is most desirable to prevent the horse from kicking in the first place.

Several devices have been designed to address the problem of horse kicking. One such device, a kicking strap, is intended as a preventative measure. However, the kicking strap does not actually prevent the horse from kicking. It prevents the horse from lifting its hindquarters high enough to hit an object with its rear feet. The kicking strap is disadvantageously complicated, can be uncomfortable for the horse and is intended for utilization on a cart-pulling horse.

Other physical restraint methods have also been utilized. One involves actually drawing a horse's foot off of the ground by tying a bowline to the horse's neck and drawing the rope through the ring on a single hobble. Other methods concentrate on punishment for unwanted behaviors. One method, known as tie-stalling, involves suspending a heavy rail horizontally from the ceiling. The rail is positioned so that if the horse kicks, he hits the rail.

Yet other punishment-based methods involve devices worn by the horse. One such device is an electronic stimulator worn around the horse's neck and activated by the trainer when the horse kicks, or exhibits some other undesired behavior. Another is a chain that is placed proximate to the top lip of the horse, wherein if the horse kicks, pressure is applied to the chain thereby inflicting painful punishment.

Other methods presently utilized to attempt to influence a horse to stop kicking exist wherein no special device is called for, but painful punishment is inflicted on the horse. One method, known as twitching, involves painfully twisting one of the ears of the horse. Another, less painful method, entails repeatedly tapping the horse between the eyes with a bottle. Unfortunately, each of the foregoing methods and devices may be intentionally unpleasant for the horse, has limited effectiveness and is thus disadvantageous in view of the present invention.

Therefore, it is readily apparent that there is a need for a method of obtaining desired animal behavior utilizing an animal ear holder apparatus capable of comfortably restraining the ears of an animal in a forward position, thereby influencing the behavior of the animal without inflicting pain.

BRIEF SUMMARY OF THE INVENTION

Briefly described, in a preferred embodiment, the present invention overcomes the above-mentioned disadvantages, and meets the recognized need for such a device, by providing an animal ear holder apparatus enabling comfortable and limited ear positioning thereby influencing animal behavior, and a method thereof.

According to its major aspects and broadly stated, the present invention is an animal ear holder apparatus capable of being easily, comfortably and securely placed on the head of an animal, wherein the ears of the animal are comfortably restrained in a forward position thereby preventing undesirable animal behaviors such as, for exemplary purposes only, kicking or bucking.

More specifically, the present invention is a pair of ear-receiving members positioned on a strap, wherein the strap is fastened about the head of an animal to substantially secure the position of the ear-receiving members thereby limiting the movement of the ears of the animal. The length and width of each ear-receiving member preferably approximately equals or exceeds the length and width of the ear of the animal intended to wear the device thereby enabling restraint of substantially all of the ear cartilage of the animal.

Each ear-receiving member is defined by a substantially rigid yet bendable frame having a non-irritating cover provided thereon. The rigidity of the frame enables the ear of an animal to be supported in a frontward position, limiting the rearward movement thereof. The flexibility of the frame enables the ear-receiving member to be bent to conform to the natural shape and curvature of the animal's ear or head thereby enabling a comfortable fit. Each ear-receiving member has an ear retention member thereon, wherein comfortable secure restraint of an animal's ear therewith is enabled. In addition, the ear-receiving members are preferably linked together to limit peripheral movement of the animal's ears. As an animal contemplates an attempt to exhibit an undesired behavior and begins to move its ears from a forward-pointing position, the ear-receiving members of the animal ear holder apparatus painlessly maintain the forward-pointing position of the animal's ears thereby preventing the animal from placing its ears back and thus, preventing the undesired behavior. Recent tests of the animal ear holder apparatus were performed on 22 horses with 100% success. Other animals were also tested with favorable results.

A feature and advantage of the present invention is the ability of such a device to provide an animal ear holder device that is capable of preventing undesirable animal behavior.

A feature and advantage of the present invention is the ability of such a device to provide an animal ear holder apparatus that enables painless influence over the behavior of an animal.

A feature and advantage of the present invention is the ability of such a method to provide a painless system of behavior control for animals.

A feature and advantage of the present invention is the ability of such a device to enable the prevention of potentially dangerous animal vices.

A feature and advantage of the present invention is the ability of such a method to influence the behavior of an animal by restraining the animal's ears.

A feature and advantage of the present invention is the ability of such a device to provide an animal behavioral modification system that is simple, easy to use and capable of being implemented by one individual.

A feature and advantage of the present invention is the ability of such a device to provide an animal ear holder device capable of comfortably restraining the ears of an animal in a forward position thereby influencing the behavior of the animal.

A feature and advantage of the present invention is the ability of such a method to provide a pleasant and effective influence over the behavior of an animal.

A feature and advantage of the present invention is the ability of such a device to provide an animal ear holder device enabling an individual to work in close proximity to an animal without fear of dangerous behaviors.

A feature and advantage of the present invention is the ability of such a device to provide an animal ear holder device enabling utilization with a variety of commonly available animal headgear.

These and other objects, features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which.

DETAILED DESCRIPTION OF THE PREFERRED AND ALTERNATE EMBODIMENTS

In describing the preferred and alternate embodiments of the present invention, as illustrated in the figures, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
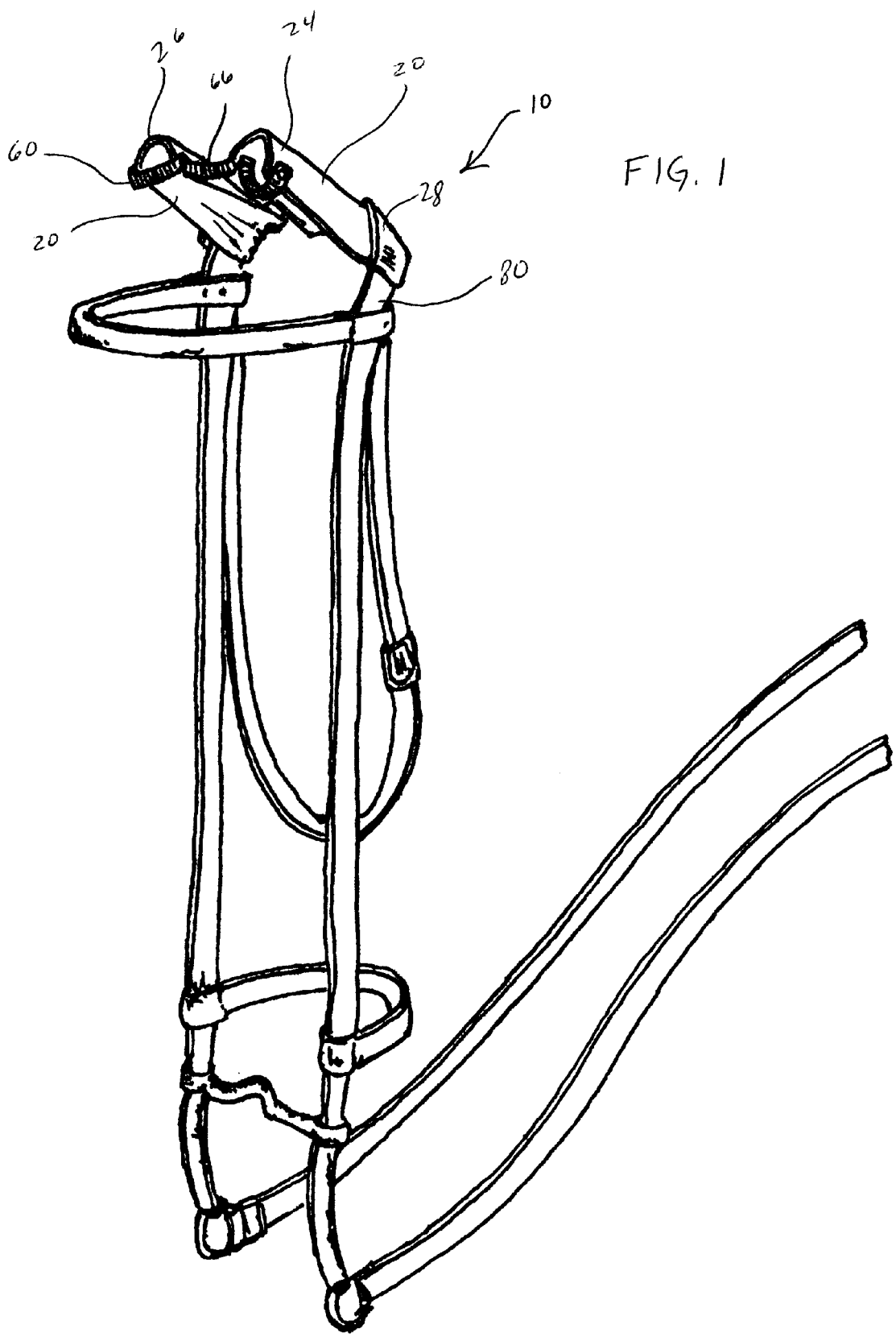
FIG. 1 is a perspective view of an animal ear holder apparatus according to a preferred embodiment of the present invention, showing the animal ear holder apparatus positioned on a bridle.
Figure 2:
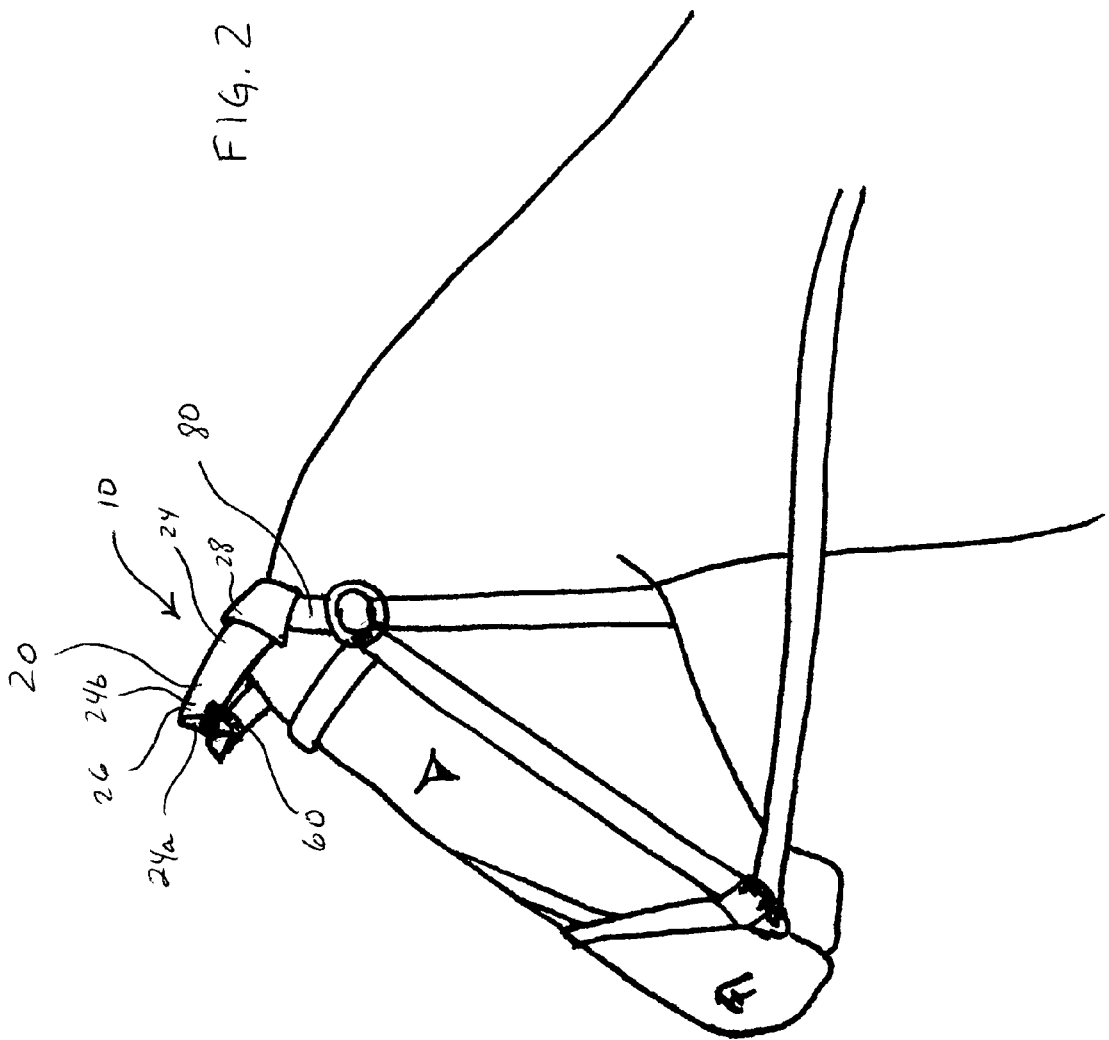
FIG. 2 is a perspective view of the animal ear holder apparatus of FIG. 1, showing a horse wearing the animal ear holder apparatus and bridle.

Referring now to FIG. 1, the present invention is an animal ear holder device 10 comprising at least one ear-receiving member 20, at least one ear retention means 60 and a support strap 80. In the preferred form, animal ear holder device 10 includes two ear-receiving members 20 to enable restraint of both ears of an animal, thereby maximizing the effectiveness of animal ear holder device 10. However, animal ear holder device 10 could be utilized with only one ear-receiving member 20, wherein only one ear of an animal would be restrained thereby, and wherein the behavior of an animal would be influenced to a lesser degree than with the preferred embodiment.

Figure 3:
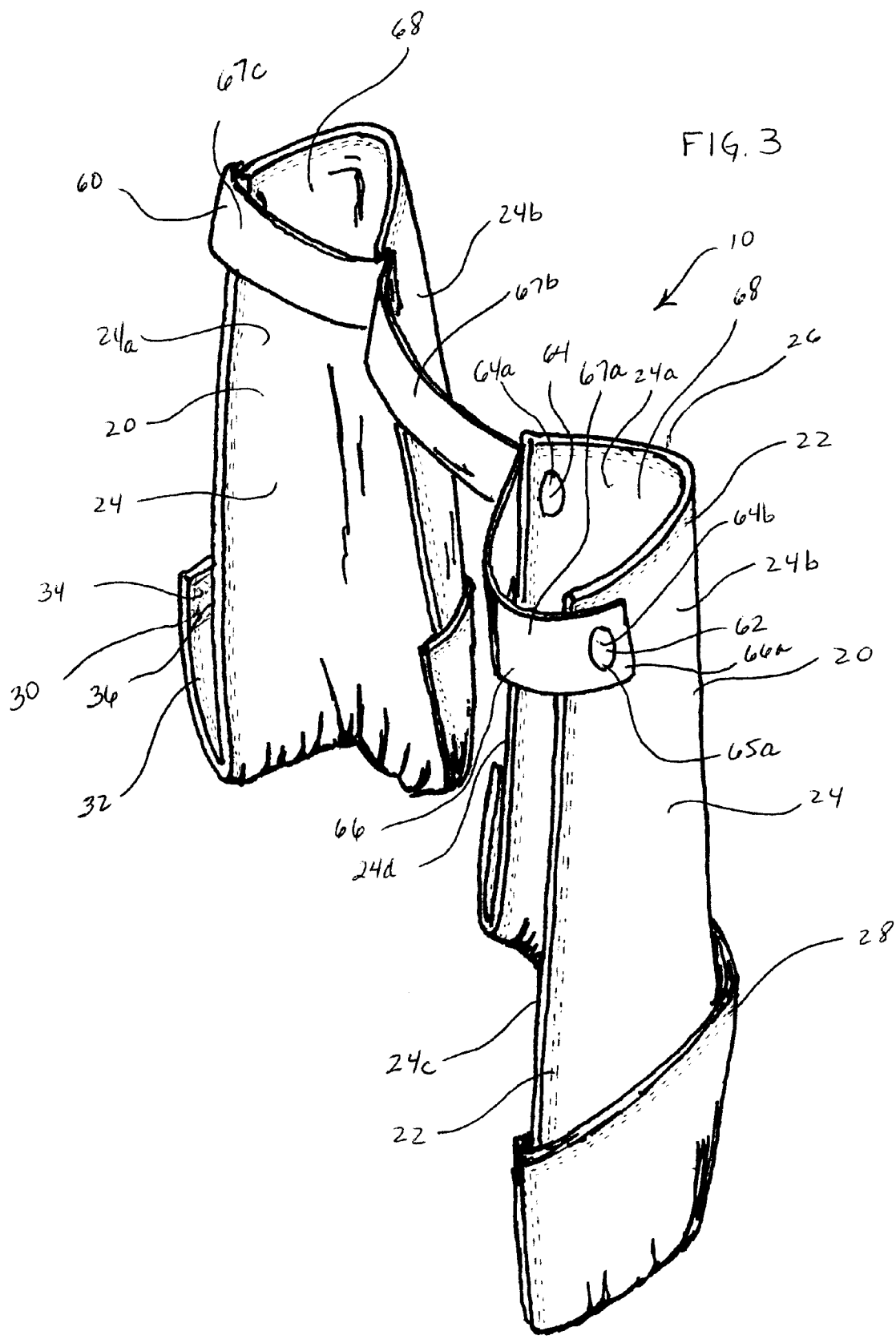
FIG. 3 is a perspective view of the animal ear holder apparatus of FIG. 1, showing a pair of ear-receiving members.
Figure 4:
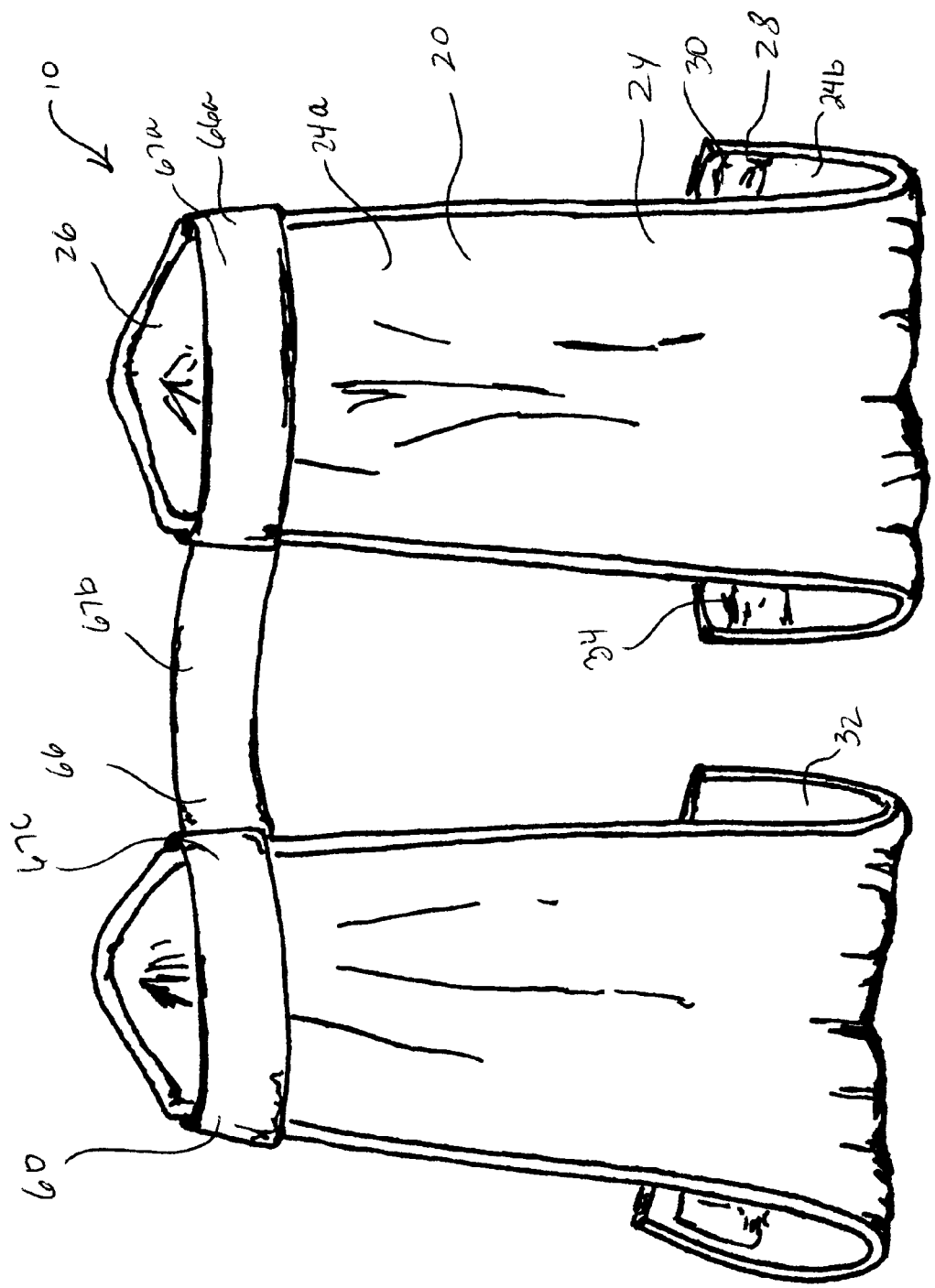
FIG. 4 is a perspective view of the animal ear holder apparatus of FIG. 1, showing an inner surface of a pair of ear-receiving members.

Now referring more specifically to FIG. 3, preferably, ear-receiving member 20 is defined by substantially rigid yet bendable frame 22 having non-irritating cover 24 provided thereon. Frame 22 is preferably metal wire, wherein the rigidity thereof enables an ear of an animal to be substantially supported. While metal wire is preferred for frame 22, one skilled in the art would readily recognize that other materials could be utilized for the construction of frame 22, such as, for exemplary purposes only, aluminum, plastic coated wire, rubber coated wire, interlocking plastic links or other suitably flexible, suitably rigid material. Preferably, frame 22 defines a substantially trapezoidal shape, wherein first end 26 and second end 28 are substantially parallel with each other and the length of second end 28 is greater than the length of first end 26. However, one skilled in the art would readily recognize that other shapes could be utilized for frame 22, such as, for exemplary purposes only, a substantially rectangular or substantially triangular shape. The flexibility of frame 22 enables first end 26 and second end 28 of ear-receiving member 20 to be bent to substantially conform to the natural substantially arcuate shape and curvature of an ear of an animal, thereby enabling a comfortable fit.

Preferably, cover 24 of ear-receiving member 20 is synthetic material capable of comfortably assisting with the support of an ear of an animal. Cover 24 preferably substantially encloses frame 22. While synthetic material is preferred for cover 24, one skilled in the art would readily recognize that other materials could be utilized, such as, for exemplary purposes only, leather, suede, canvas, natural fabric, synthetic fabric, webbing or netting.

Preferably, the length and width dimensions of frame 22 and cover 24 are approximately equal to the length and width dimensions of the ear of the animal intended to wear the device, thereby enabling effective restraint of substantially all of the ear cartilage of the animal and maximizing the effectiveness of animal ear holder device 10. However, in an alternate embodiment, animal ear holder device 10 could be utilized wherein the length of frame 22 and cover 24 thereof define an ear-receiving member 20 that extends only a portion of the length of the ear of the animal intended to wear the device, such as, for exemplary purposes only, halfway from the crown of the head to the tip of the ear. Wherein the length of ear-receiving member 20 prevents the restraint of the full length of the ear of the animal, the behavior of the animal is influenced to a lesser degree than with the preferred embodiment.

Preferably, ear-receiving member 20 has closure means 30 proximate to second end 28 thereof, thereby forming strap retention channel 32. Closure means 30 is preferably hook and loop fastener, wherein first hook and loop member 34 is provided on inner surface 24a of cover 24, proximate to second end 28 thereof. Second hook and loop member 36 is preferably provided on inner surface 24a of cover 24 at a distance away from second end 28 thereof, whereby folding second end 28 toward inner surface 24a of cover 24 enables closure of first and second hook and loop members 34 and 36, respectively, thereby defining strap retention channel 32, wherein support strap 80 is held therein. The position of second hook and loop member 36 relative to second end 28 of cover 24 defines the dimension of strap retention channel 32 and thus is dependent upon the dimension of the support strap 80 intended to be retained therein. While hook and loop fastener is the preferred type of closure means 30, one skilled in the art would readily recognize that other closure means could be utilized, such as, for exemplary purposes only, snaps, clamps, buttons, rings or zippers, or, alternatively, strap retention channel 32 could be permanently defined in ear-receiving member 20.

Figure 5:
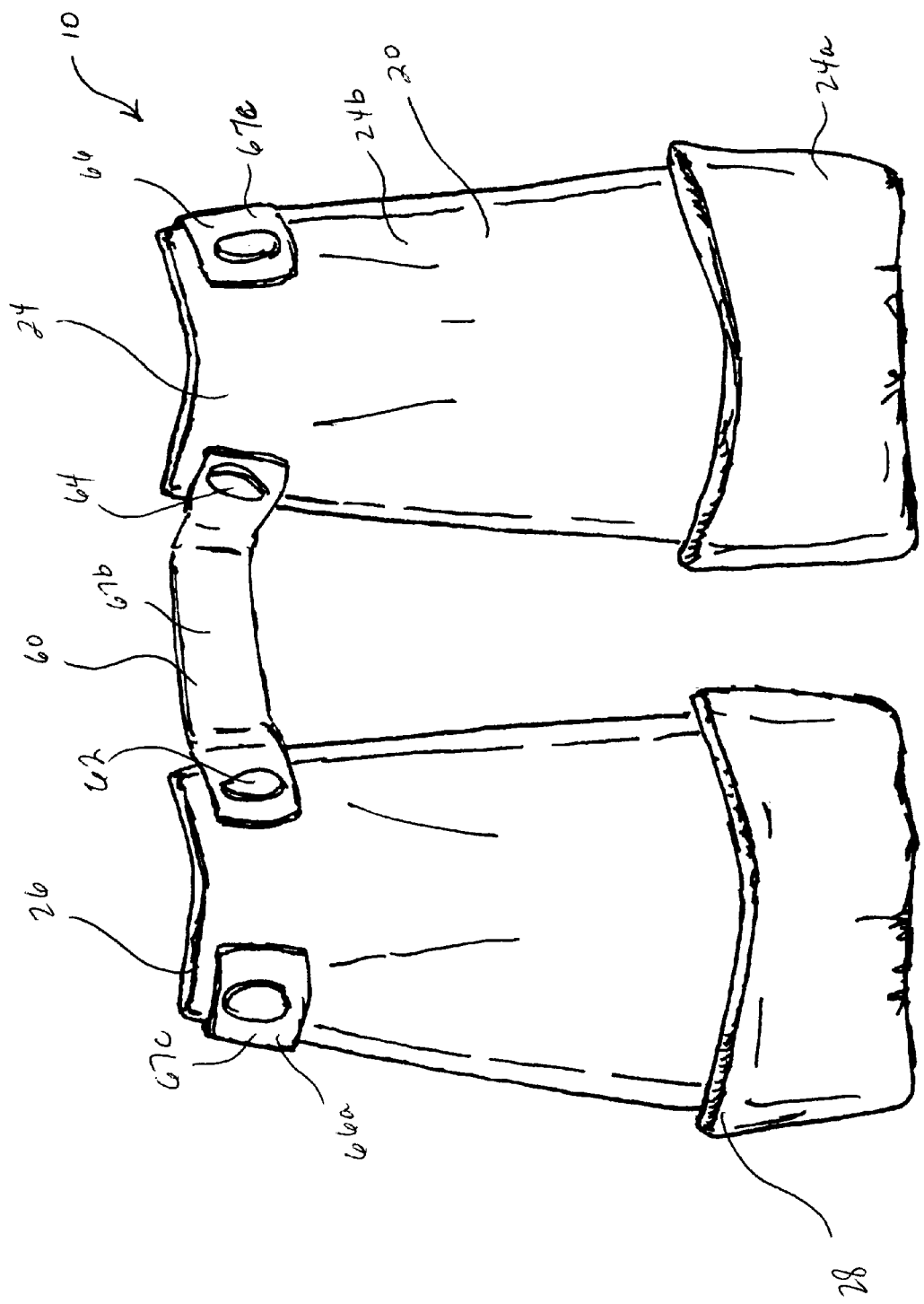
FIG. 5 is a perspective view of the animal ear holder apparatus of FIG. 1, showing an outer surface of a pair of ear-receiving members.

Now referring more specifically to FIG. 5, preferably, at least one ear retention means 60 is positioned proximate to first end 22 of each ear-receiving member 20. Preferably, ear retention means 60 is woven nylon member 66 with fastening means 62 provided thereon.

While woven nylon member 66 is the preferred material for ear retention means 60, one skilled in the art would readily recognize that other materials could be utilized, such as, for exemplary purposes only, leather, cloth, synthetic material or non-pinching flexible links. It is also contemplated within the scope of the present invention that more than one ear retention means 60 could be provided, or that ear retention means 60 could be defined integral to ear-receiving member 20 or cover 24 thereof.

Preferably, fastening means 62 for ear retention means 60 is snap 64, wherein first interlocking portion 64a thereof is positioned proximate to outer elongated edge 24c and inner elongated edge 24d on outer surface 24b of cover 24 proximate to first end 22 thereof. Preferably, second interlocking portion 64b of snap 64 is positioned on ear retention means 60, whereby fastening of snap 64 securely and removably affixes ear retention means 60 to cover 24 of ear-receiving member 22. While snap 64 is the preferred fastening means 62 for ear retention means 60, one skilled in the art would readily recognize that other fasteners could be utilized, such as, for exemplary purposes only, hook and loop fastener, clips, clamps, buttons, zippers or ties. It is also contemplated within the scope of the present invention that ear retention means 60 could be permanently affixed to ear-receiving member 20 or cover 24 thereof.

In the preferred embodiment, each woven nylon member 66 has interlocking portions 64b of snap 64 provided thereon, wherein each interlocking portion 64b is positioned to enable secure, removable placement of ear retention means 60 on ear-receiving member 20 proximate to first end 22 thereof. One interlocking portion 65a is positioned proximate to first end 66a of woven nylon member 66, enabling woven nylon member 66 to be secured proximate to outer elongated edge 24c of cover 24 proximate to first end 22 thereof. One interlocking portion 65b is positioned at a distance away from first end 66a of woven nylon member 66, defining ear strap portion 67a, thereby enabling woven nylon member 66 to be secured proximate to inner elongated edge 24d of cover 24 proximate to first end 22 thereof, wherein woven nylon member 66 passes over inner surface 24a, defining ear-receiving depression 68 therein.

In the preferred embodiment, wherein two ear-receiving members 20 are provided, woven nylon member 66 preferably extends between and links ear-receiving members 20 with linking portion 67b, wherein snap 64 is positioned in substantially the same manner on each ear-receiving member 20 and linking portion 67b extends therebetween. Linking portion 67b effectively limits peripheral movement of the ears of an animal relative to each other.

Support strap 80 can be provided via a bridle 100, as shown in FIG. 1, a halter or other suitable known animal headgear. It is contemplated within the scope of the present invention that while ear-receiving members 20 can be utilized with known animal headgear, animal ear holder device 10 could be formed as a separate piece of headgear with ear-receiving members 20 permanently provided thereon.

In an alternate embodiment, frame 22 could be a substantially flat plate of aluminum, other appropriate metal or resilient plastic, wherein the dimensions of the plate could substantially define the dimensions of the ear-receiving member 20 and cover 24 could substantially cover the plate.

In an alternate embodiment, frame 22 could be a substantially flat plate of resilient material, wherein the dimensions of the plate could substantially define the dimensions of the ear-receiving member 20 with no cover 24 provided thereon.

In an alternate embodiment, cover 24 could be provided with decorative features, emblems or logos.

In an alternate embodiment, ear-receiving members 20 could be formed without strap retention channel 32 defined therein, wherein ear-receiving members 20 could be secured to support strap 80 with snaps, clips, stitching or other appropriately strong and supportive attachment means.

In use, ear-receiving members 20 are placed onto support strap 80, wherein ear holder device 10 is secured onto an animal. Each ear of the animal is placed proximate to inner surface 24a of ear-receiving member 20, ear retention means 60 is secured and the ear of the animal is thereby restrained in a preferably substantially forward position. As the animal contemplates an attempt to exhibit an undesired behavior and begins to move its ears from a forward-pointing position, ear-receiving members 20 of animal ear holder apparatus 10 painlessly maintain the forward-pointing position of the animal's ears, thereby preventing the animal from placing its ears back and thus preventing the undesired behavior.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. An ear holder device for animal headgear comprising: of at least one ear receiving member having a first end and a second end; and means for securing said ear receiving member to the animal headgear designed to hold at least one ear receiving member in a forward position wherein said means for securing said ear receiving member to the animal headgear is a channel defined by said second end of said ear receiving member and wherein the animal headgear is carried and secured within said channel.

2. The ear holder device for animal headgear of claim 1, wherein said second end of said ear receiving member has a non-permanent closure means carried thereon for defining said channel.

3. The ear holder device for animal headgear of claim 2, wherein said non-permanent closure means is hook and loop fastener.

4. The ear holder device for animal headgear of claim 1, wherein said ear receiving member has a frame.

5. An ear holder device for animal headgear, comprising: at least one ear receiving member having a first end and a second end and means for securing said receiving member to the animal headgear wherein said at least one ear receiving member holds the ear in a forward position, further comprising at least one ear retaining member proximate to said first end of said ear receiving member, Said ear retaining member further comprises at least one strap and at least one means for fastening said strap to said ear receving member is a plurality of snap elements.

6. The ear holder device for animal headgear of claim 5, wherein said means for fastening said strap to said ear receiving member is a plurality of snap elements.

7. An ear holder device for animal head gear, comprising at least one ear receiving member having a first end and a second end; and a means for securing said ear receiving member to the animal headgear; wherein said at least one ear receiving member holds the ear in a forward position further comprising at least one ear retaining member proximate to said first end of said ear receiving member and wherein said ear retaining member further comprises a pocket defined on said ear receiving member, proximate to said first end thereof for receiving a portion of an ear of an animal therein.

8. An ear position limitation device for an animal, comprising: a wearable strap; at least one ear receiving member having an inner surface, a first end and second end; at least one ear retaining member carried by said inner surface of said ear receiving member; means for securing said ear receiving member to said wearable strap is a channel defined by said second end of said ear receiving member and wherein said wearable strap is carried and secured in said channel.

9. The ear position limitation device for an animal of claim 8, wherein said second end of said ear receiving member has a non-permanent closure means carried theron for defining said channel.

10. The ear position limitation device for an animal of claim 9, wherein said non-permanent closure means is hook and loop fastener.

11. The ear position limitation device for an animal headgear of claim 8, wherein said ear receiving member has a frame.

12. The ear position limitation device for an animal of claim 8, wherein said ear retaining member futher comprises at least one detachable elongated band and at least one means for fastening said band to said ear receiving member.

13. The ear position limitation device for an animal of claim 12, wherein said means for fastening said band to said ear receiving member is a plurality of interlocking elements.

14. An ear position limitation device for an animal, comprising: a wearable strap; at least one ear receiving member having an inner surface, a first end and a second end; at least one ear retaining member carried by said inner surface of said ear receiving member; means for securing said ear receiving member to said strap, wherein said wearable strap further comprises a bridle.

15. An ear position limitation device for an animal, comprising a wearable strap; at least one ear receiving member having an inner surface, and a first end and a second end; at least one ear retaining member carried by said inner surface of said ear receiving member; means for securing said ear receiving member to said wearable strap: wherein said wearable comprises a halter.

16. A method of obtaining desired animal behavior by restraining the ears of an animal in a forward position comprising the steps of:
  a) obtaining an animal ear holder apparatus for an animal headgear wherein said ear holder apparatus includes at least one ear receiving member which is secured to the animal headgear by means of a channel defined in an end of said at least one ear receiving member and wherein the animal headgear is carried and secured within the channel;
  b) placing the animal ear holder apparatus onto a selected animal; and
  c) placing an ear of the selected animal into said at least one ear receiving member wherein said at least one ear receiving member holds the ear in a substantially forward pointing position thereby preventing the animal from placing its ears back and thus preventing the undesired behavior.

* * * * *